United States Patent [19]
Offenberg et al.

[11] Patent Number: 5,627,317
[45] Date of Patent: May 6, 1997

[54] ACCELERATION SENSOR

[75] Inventors: Michael Offenberg, Tuebingen; Wolfgang Buchholtz, Pfullingen; Markus Lutz, Reutlingen, all of Germany

[73] Assignee: Robert Bosch GmbH, Stuttgart, Germany

[21] Appl. No.: 466,841

[22] Filed: Jun. 6, 1995

[30] Foreign Application Priority Data

Jun. 7, 1994 [DE] Germany ............... 44 19 844.2

[51] Int. Cl.$^6$ ............... G01P 15/125
[52] U.S. Cl. ............... 73/514.32; 73/514.35; 73/862.626
[58] Field of Search ............... 73/514.32, 514.35, 73/514.36, 514.38, 514.21, 514.24, 862.626; 361/280, 283.1

[56] References Cited

U.S. PATENT DOCUMENTS

| | | | |
|---|---|---|---|
| 5,233,213 | 8/1993 | Marek | 73/514.32 |
| 5,417,111 | 5/1995 | Sherman et al. | 73/514.36 |
| 5,447,068 | 9/1995 | Tang | 73/514.32 |
| 5,461,916 | 10/1995 | Fujii et al. | 73/514.32 |

FOREIGN PATENT DOCUMENTS

WO92/03740 3/1992 WIPO.

*Primary Examiner*—John E. Chapman
*Attorney, Agent, or Firm*—Kenyon & Kenyon

[57] ABSTRACT

A sensor in which the structure of a movable element is produced from an upper silicon layer of a laminated substrate. Individual regions of the upper layer are insulated from one another by insulation trenches which are bridged by conductor tracks coupled to at least one electrode on the movable element and at least one stationary electrode on the upper layer proximate to the at least one electrode on the movable element.

8 Claims, 1 Drawing Sheet

ACCELERATION SENSOR

FIELD OF INVENTION

The present invention relates to an acceleration sensor, particularly to a sensor with a laminated substrate having an upper silicon layer with a movable element which can be moved due to a force or acceleration.

BACKGROUND INFORMATION

An acceleration sensor with a laminated substrate structure is described in Published PCT International Application No. WO 92/03740. In the sensor described therein, a polysilicon layer is applied to a silicon substrate, with a movable element being formed in the polysilicon layer. Electrical supply lines to the movable element are provided by means of dopants introduced into the silicon substrate. The upper polysilicon layer is insulated from the underlying silicon substrate by means of a p-n junction.

SUMMARY OF THE INVENTION

The present invention provides a sensor, which in contrast to known sensors, has the advantage that low-resistance electrical contacting of individual regions of the sensor is achieved using particularly simple means. Furthermore, the insulating properties of the individual regions with respect to one another are particularly good.

A particularly simple sensor structure in accordance with the present invention is provided with depletion layer insulation by means of a p-n junction between upper and lower silicon layers. Particularly good insulation of the individual sensor regions from one another is achieved by using a dielectric interlayer between the silicon layers. The insulation trenches can be filled with polysilicon and a dielectric or exclusively with a dielectric.

DETAILED DESCRIPTION OF THE DRAWINGS

Figure 1:
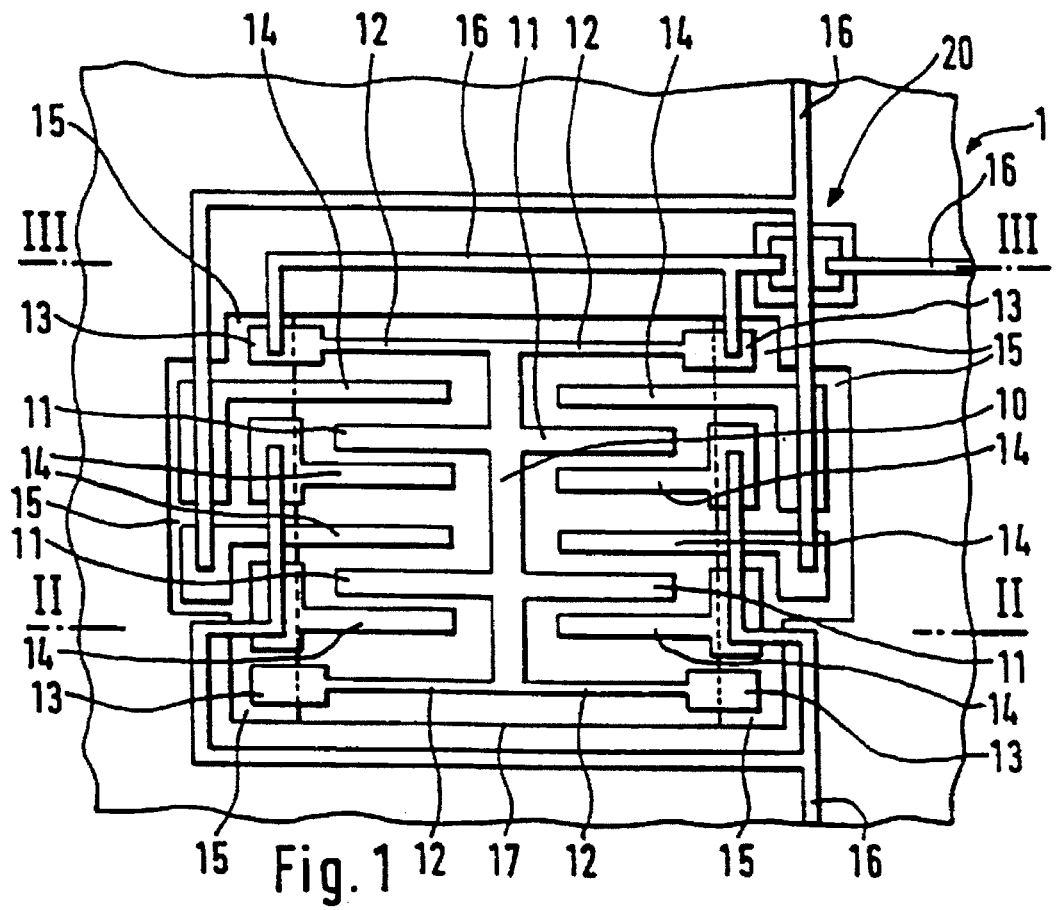
FIG. 1 is a plan view of a sensor according to the present invention.
Figure 3:
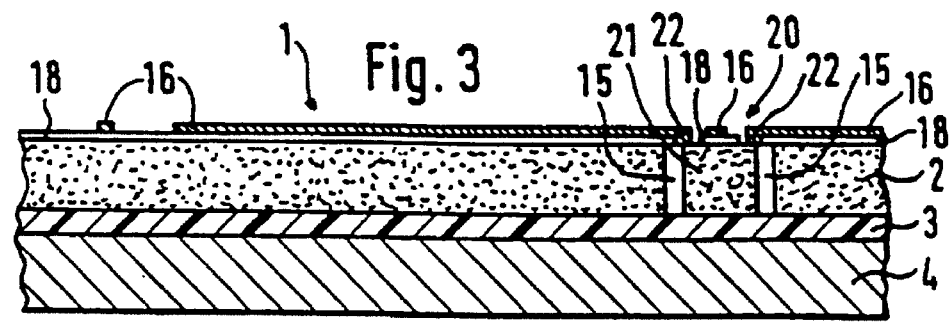
FIG. 3 shows a cross-section III—III of the sensor of FIG. 1.
Figure 2:
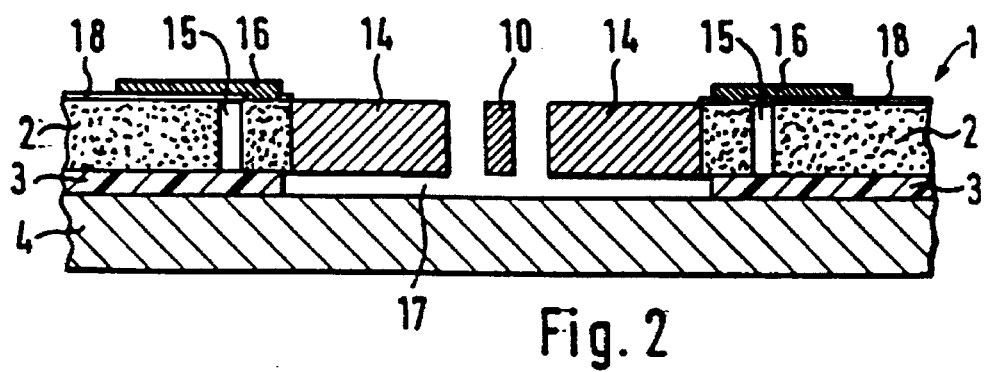
FIG. 2 shows a cross-section II—II of the sensor of FIG. 1.

FIG. 1 shows a plan view of a sensor in accordance with the present invention. FIGS. 2 and 3 show cross-sections through FIG. 1 along the lines II—II and III—III, respectively. The structure of the sensor of the present invention is produced from a laminated plate 1. As can be seen in FIGS. 2 and 3, the laminated plate 1 comprises an upper silicon layer 2, an insulation layer 3 underneath the upper layer 2, and a silicon substrate 4 underneath the insulation layer 3.

The structure of a movable element having a seismic mass 10, with movable electrodes 11 suspended from the seismic mass 10, is produced from the upper silicon layer 2. The seismic mass 10 is suspended from bearing blocks 13 by means of flexural springs 12. Fixed electrodes 14 are arranged opposite the movable electrodes 11. The seismic mass 10, with the movable electrodes 11 and the spiral springs 12, is detached from the substrate 4 by means of an undercut 17, thereby allowing these elements to move relative to the substrate 4. In the exemplary embodiment shown, because the flexural springs 12 have a relatively small thickness, the seismic mass 10 can be moved by an acceleration parallel to the surface of the substrate 4. The thickness of the fixed electrodes 14 is such that the fixed electrodes 14 are displaced by an acceleration only to an insignificant extent.

The individual components of the sensor of the present invention are insulated from one another. All of the elements formed from the upper layer 2 are insulated from the substrate 4 by means of the insulation layer 3 that is arranged between the upper silicon layer 2 and the silicon substrate 4. Furthermore, insulation trenches 15 are introduced into the upper silicon layer 2 which extend completely through the upper layer. The insulation trenches 15 achieve an insulation of individual sensor regions from one another. As can be seen in the plan view of FIG. 1, the bearing blocks 13 are completely surrounded by insulation trenches 15, thereby insulating the bearing blocks 13 from the other sensor components. Furthermore, the suspension of each fixed electrode 14 is surrounded completely by the insulation trenches 15. The movable elements, i.e., the seismic mass 10, the electrodes 11 and the spiral springs 12, are thus completely insulated from all other components of the sensor. Furthermore, each fixed electrode 14 is electrically insulated from all other sensor components.

Electrical contact with individual components of the sensor is provided by conductor tracks 16 comprising a metal or another suitable electrically conducting material such as polysilicon. A surface insulation layer 18 is provided to insulate the conductor tracks 16 from the upper silicon layer 2. For the sake of clarity, the surface insulation layer 18 is not shown in FIG. 1. No insulation 18 is provided at points where it is desired that the conductor tracks 16 make contact with the silicon of the upper silicon layer 2. A direct contact between the conductor track 16 and the upper silicon layer 2 thus results at the openings in the insulation layer 18.

The fixed electrodes 14 and the movable electrodes 11 form therebetween a multiplicity of individual capacitors, the capacitances of which are changed by a displacement of the seismic mass 10. The fixed electrodes 14 are interconnected by the conductor tracks 16 so that all of the capacitors which experience an increase in capacitance for a predetermined acceleration direction are connected in parallel. Similarly, all the capacitors which experience a decrease in capacitance for the predetermined acceleration direction are correspondingly interconnected in parallel.

Four bearing blocks 13 and the seismic mass 10, from which four movable electrodes 11 are suspended, can be discerned in the plan view of FIG. 1. Many different arrangements of the movable electrodes 11 are, however, conceivable. Furthermore, the seismic mass 10 can be configured in any other desired shape. Other arrangements and interconnections of the fixed electrodes 14 are also conceivable. For example, fixed electrodes can also be arranged opposite the flexural springs 12.

FIG. 2 shows the undercut 17 beneath the movable elements. The undercut 17 is produced in this case by etching away the insulation layer 3 arranged between the upper silicon layer 2 and the silicon substrate 4. Particularly good insulation of the upper silicon layer 2 from the silicon substrate 4 is achieved by means of the insulation layer 3. The respective dopings of the upper silicon layer 2 and the lower silicon layer 4 can therefore be chosen independently of one another. It is also possible, however, for the silicon layer 2 to lie directly on the silicon layer 4. In this case, the silicon layer 2 is insulated from the silicon substrate 4 by means of depletion layer insulation, i.e., by means of a corresponding p-n junction between the layers. To produce the undercut 17, there is provided in that case only one layer underneath the movable sensor structures, which layer can then be removed.

The insulation trenches 15 extend from the top of the upper silicon layer 2 down as far as the insulation layer 3. The insulation trenches 15 are filled with a material which ensures insulation between any two regions of the upper silicon layer 2 that are separated by an insulation trench 15. To produce the insulation trenches 15, a trench is initially etched into the upper silicon layer 2. This trench is then filled with an insulating material. For this purpose, the interior of the trench can be oxidized and then filled with a polysilicon. Insulation is then effected by the oxide layers. As an alternative, it is possible to fill the trenches completely with an insulating material, for example silicon oxide, silicon nitride, plastics or glasses. As can be seen in the cross-section shown in FIG. 2, the insulation trenches 15 form together with the silicon of the upper silicon layer 2 a smooth surface, which is represented here in an idealized manner. A smooth continuous surface makes it easier to lead the conductor tracks 16 across the trenches 15 and thus to be able specifically to make contact with different regions of the upper silicon layer 2 by means of a conductor track 16. In this case, the use of conductor tracks 16 enables the individual regions to be interconnected with a particularly low resistance.

The insulation trenches 15 can also be used for forming a conductor track crossing 20. A conductor track crossing 20 of this type is shown in the plan view of FIG. 1 and in the cross-section view of FIG. 3. To form the conductor track crossing 20, a region 21 of the upper silicon layer 2 is enclosed completely by insulation trenches 15. A contact 22 is provided at each of two edges of the region 21 by means of which two conductor tracks make contact with the region 21. If a further conductor track 16 that is lead over the region 21 between the two contacts 22 is insulated from the region 21 by the layer 18, then this structure can be used for tunneling under the further conductor track 16. A conductor track crossing 20 is created in this way.

What is claimed is:

1. A sensor for measuring a force or acceleration, comprising:
    a laminated substrate including:
        an upper silicon layer including a movable element which can be moved due to the force or acceleration and a stationary element,
        an underlying layer,
        means for insulating the upper silicon layer from the underlying layer, and
        electrical supply lines arranged on an upper surface of the upper silicon layer, the electrical supply lines being coupled to the movable and stationary elements; and
    a conductor track crossing which includes a region insulated from a remainder of the upper silicon layer, wherein a conductor track lies directly on the insulated region between two contacts and is insulated from the insulated region by means of a surface insulation layer,
    wherein:
        the upper silicon layer includes insulation trenches which penetrate the upper silicon layer completely, for mutually insulating individual regions of the upper silicon layer, and
        the electrical supply lines bridge the insulation trenches between the mutually insulated regions of the upper silicon layer.

2. The sensor according to claim 1, wherein the upper silicon layer is insulated from the underlying layer by means of a p-n junction.

3. The sensor according to claim 1, wherein the upper silicon layer is insulated from the underlying layer by means of an insulation layer between the upper silicon layer and the underlying layer.

4. The sensor according to claim 1, wherein the insulation trenches are filled with a dielectric.

5. The sensor according to claim 4, wherein the insulation trenches are oxidized before being filled with polysilicon.

6. The sensor according to claim 4, wherein the insulation trenches are filled with silicon oxide.

7. The sensor according to claim 1, wherein:
    the movable element includes a seismic mass which is movably suspended from springs,
    at least one movable electrode is attached to the seismic mass,
    at least one fixed electrode is arranged on the stationary element opposite the at least one movable electrode,
    the at least one movable electrode and the at least one fixed electrode are insulated from one another, and
    a spacing between the at least one movable electrode and the at least one fixed electrode changes when the sensor experiences the acceleration.

8. The sensor according to claim 1, wherein the electrical supply lines connect one of the mutually insulated regions with another one of the mutually insulated regions.

* * * * *